(12) United States Patent
Pellman (10) Patent No.: US 9,724,656 B2
(45) Date of Patent: Aug. 8, 2017

(54) MIXING SCREW

(75) Inventor: David C Pellman, Coleman, WI (US)

(73) Assignee: Patz Corporation, Pound, WI (US)

( * ) Notice: Subject to any disclaimer, the term of this patent is extended or adjusted under 35 U.S.C. 154(b) by 126 days.

(21) Appl. No.: 13/352,205

(22) Filed: Jan. 17, 2012

(65) Prior Publication Data

US 2012/0182830 A1    Jul. 19, 2012

Related U.S. Application Data

(60) Provisional application No. 61/433,522, filed on Jan. 17, 2011.

(51) Int. Cl.
*B01F 7/24* (2006.01)
*B01F 13/00* (2006.01)

(52) U.S. Cl.
CPC ............ *B01F 7/245* (2013.01); *B01F 13/004* (2013.01); *B01F 2215/0008* (2013.01)

(58) Field of Classification Search
CPC ...... A01K 5/004; B01F 7/00416; B01F 7/245
USPC ...... 366/318, 323, 603; 241/101.76, 101.761
See application file for complete search history.

(56) References Cited

U.S. PATENT DOCUMENTS

| 1,769,575 | A | * | 7/1930 | Haines | 366/266 |
| 2,725,037 | A | * | 11/1955 | Ritchey | A01K 15/003 119/822 |
| 5,007,590 | A | * | 4/1991 | Taylor | 241/25 |
| 5,297,744 | A | * | 3/1994 | Clinton | B02C 18/067 209/221 |
| 5,429,436 | A | | 7/1995 | Stone | |
| 5,601,362 | A | | 2/1997 | Schuler | |
| 6,863,433 | B2 | * | 3/2005 | Knight | 366/314 |
| 7,507,016 | B2 | * | 3/2009 | Huberdeau et al. | 366/314 |
| 2004/0146628 | A1 | * | 7/2004 | Walter | A23J 1/14 426/630 |
| 2011/0110184 | A1 | * | 5/2011 | Liet | 366/310 |
| 2011/0121114 | A1 | | 5/2011 | Neier et al. | |

FOREIGN PATENT DOCUMENTS

JP 10-151435 6/1998
WO WO 03018441 A1 * 3/2003

OTHER PUBLICATIONS

Search Report mailed Aug. 7, 2012 for PCT/US2012/021578.

* cited by examiner

*Primary Examiner* — Abbas Rashid
(74) *Attorney, Agent, or Firm* — Stephen C. Jensen; Northwind IP Law, S.C.

(57) ABSTRACT

An auger for a vertical feed mixer with a lifting surface that is upwardly angle from an inner edge toward an outer edge. A fliting portion to form a part of an auger for a vertical feed mixer, the fliting portion including an outer edge that is positioned higher than a radially positioned inner edge. An auger for a vertical feed mixer that in rotation defines an hourglass shape.

8 Claims, 8 Drawing Sheets

MIXING SCREW

CROSS-REFERENCE TO RELATED APPLICATION

The present application claims priority to earlier filed U.S. Provisional Application Ser. No. 61/433,522, filed on Jan. 17, 2011, and, the disclosure of which is incorporated herein by reference in its entirety.

BACKGROUND

Conventional vertical feed mixers incorporate a central rotating shaft with helical fliting or a screw mounted about the shaft. The rotation of the shaft rotates the screw so that a lower end of the screw, having a leading edge, will move forward about a base of an interior feed mixing hopper. As the leading edge encounters feed within the hopper, the feed is directed up a ramped face of the screw. As the screw rotates, the feed rises higher in the screw until in cascades off an outer edge of the screw fliting or rises to the upper trailing edge of the screw where is falls back toward the base of the hopper. The purpose of the screw is to mix the feed and reduce the feed to more uniform particle sizes.

The action of the screw through the feed serves to thoroughly mix the feed with the hopper so that a uniform ration comprised of multiple ingredients, feeds or supplements may be distributed from the hopper. The screw also works to chop larger clumps of feed or silage into smaller pieces.

It is desirable to improve the ability of the fliting to mix and chop the feed within the hopper.

DESCRIPTION OF THE DRAWINGS

The accompanying drawing figures, which are incorporated in and constitute a part of the description, illustrate several aspects of the invention and together with the description, serve to explain the principles of the invention. A brief description of the figures is as follows.

DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
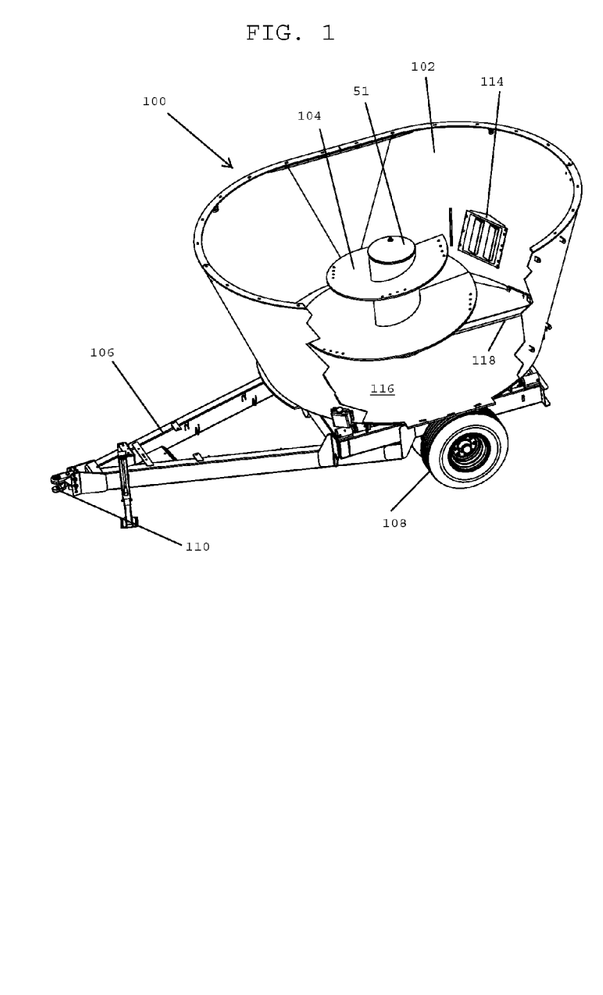
FIG. 1 is a perspective view of a vertical feed mixer according to the present disclosure with a portion of a side wall of a mixing tub not shown for clarity.
Figure 2:
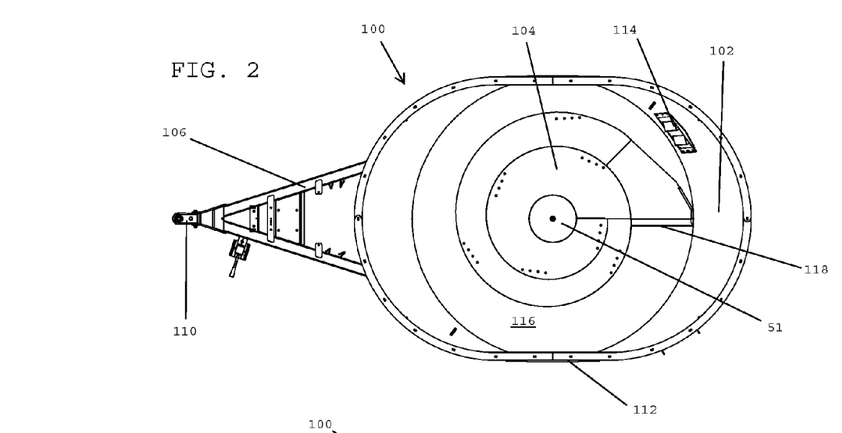
FIG. 2 is a top view of the vertical feed mixer of FIG. 1 with the complete side wall of the mixing tub shown.
Figure 3:
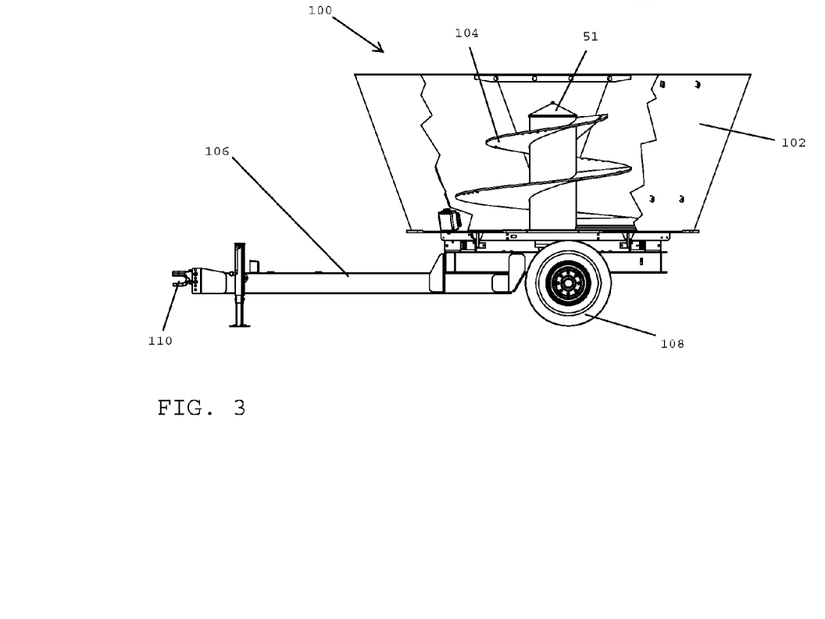
FIG. 3 is a side view of the vertical feed mixer of FIG. 1.

Referring now to FIGS. 1 to 3, a vertical feed mixer 100 according the present disclosure includes a tub 102 within which feed for livestock or other animals may be mixed, and a vertical mixing auger 104 mounted within tub 102 and configured to be rotated with a vertical shaft or hub 51. Shaft 51 may be driven by a motor mounted beneath tub 102 as part of mixer 100 or may be driven by a transmission motivated by a power take off assembly associated with a vehicle that may be attached to mixer 100. Tub 102 may be mounted to a frame 106 which may be include one or more axles 108 for facilitating movement of mixer 100. Frame 106 may include a hitch 110 for engaging a vehicle to move mixer 100 about a farm or feedlot as needed to feed or provide other nutrients to livestock or other animals.

Before feed is delivered to the animals, a variety of feed constituents and/or supplements may be added into tub 102 and auger 104 may be rotated within the tub to mix into a generally uniform or homogenous blend and chop the feed into a generally uniform size. Once the feed has been prepared, an opening 112 may be provided in a sidewall of tub 102 to permit the discharge of the feed. Rotation of the auger may then be used to aid in the uniform distribution of the feed as the mixer is pulled along or as a conveyor carries feed away from the mixer.

It is not uncommon for metallic contaminants to be accidentally introduced into of with the feed constituents. Examples of this might be but are limited to bailing wire from the hay or other fodder bundling arrangements, or loose parts or pieces of farm equipment or other machinery. Having such metallic contaminants in the feed is not desirable as this may injure the animals being fed. A magnet 114 may be included within tub 102 along a side wall adjacent a the bottom 116 of tub 102. Such a location will allow the magnet to act on feed as it is being moved about by a lower leading edge 118 of auger 104. In this location, the mixed feed may make multiple passes adjacent magnet 114 as the feed is mixed and then rotated by the auger for delivery through opening 112. The more passes the feed makes past magnet 114, the better the opportunity for any metallic contaminants to be removed from the feed and held to magnet 114 for removal when the tub is empty.

As illustrated in FIGS. 1, 3, 10 and 11, the magnet 114 includes a pair of spaced apart steps 115. Steps 115 are ramp-shaped, having a lower-angled, feed-facing side 115a, with a steeper-angled leeward side 115b cooperating with the space 115c after each of the steps ("after" in terms of the direction of motion of the auger 104 and the feed). And as shown in FIG. 1, the magnet 114 is rotated so that the top is slightly to the right of the bottom, and so that the steps 115 are substantially normal to the direction of feed flow on the auger 104.

It may be preferable to have magnet 114 mounted above the bottom of the tub but adjacent the bottom of the tub and slightly above a height of the leading edge of the auger. Thus positioned, as feed is lifting from the bottom of the tub by the auger, and forced outward on the lifting surface of the auger, the feed will be forced to pass close to magnet 114 but will not be pressed against the magnet so as to not dislodge any metal already adhering to the magnet. It may also be preferable to have magnet 114 mounted at a position away from the discharge opening to ensure that feed being pressed toward the discharge opening does not drag against the magnet and dislodge metal already adhering to the magnet as the mixed feed is discharged.

Figure 4:
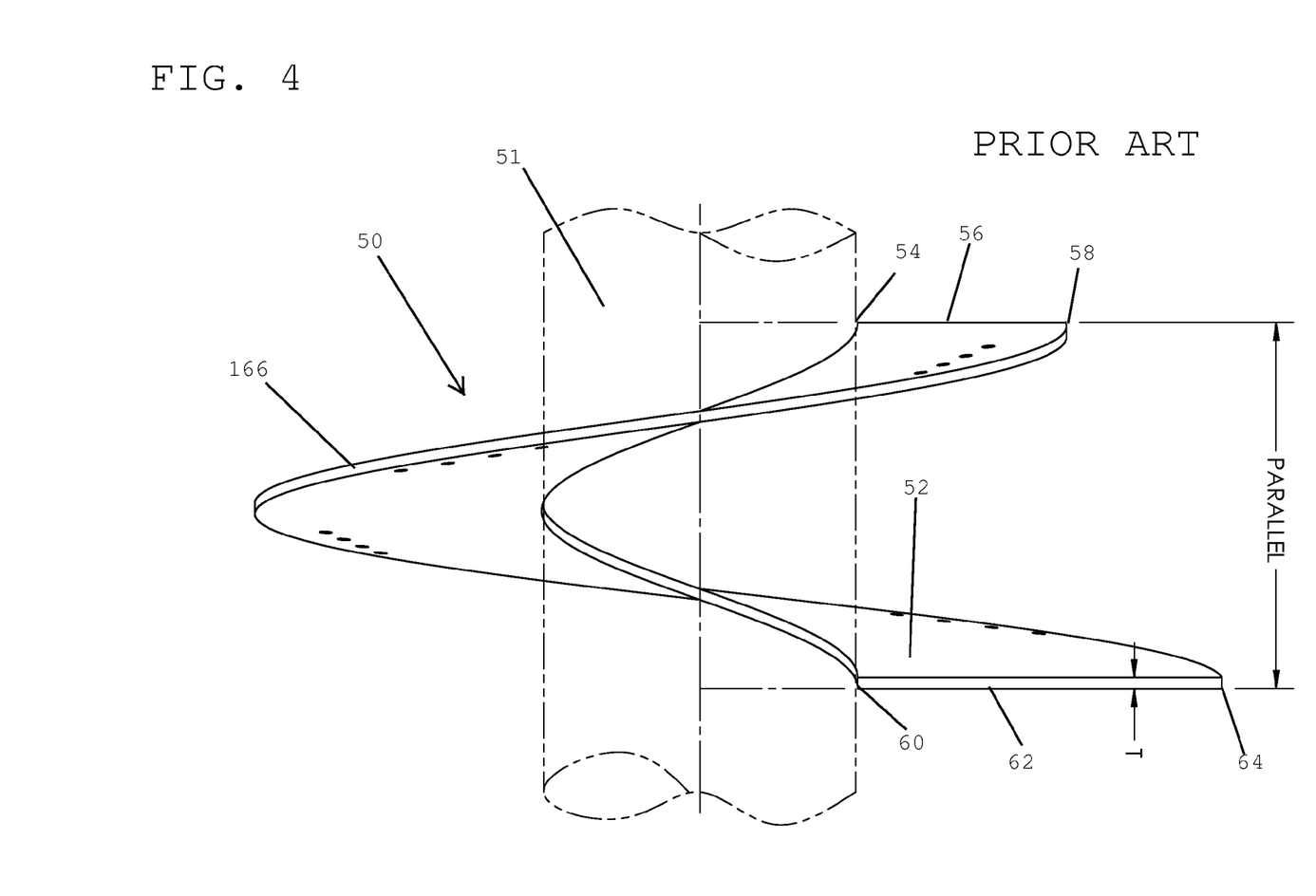
FIG. 4 is a side view of a portion of the fliting of a prior art mixing auger.

Referring now to FIG. 4, a fliting portion 50 of a prior art auger is shown. Fliting 50 may be used as a portion of an auger within a vertical feed mixer configured similarly to mixer 100. Fliting portion 50 is configured such the an inner edge 154 (adjacent shaft 51) of an upper radial 156 is at generally the same height as an outer edge 158. Similarly, an inner edge 160 of a lower radial 162 is generally at the same height as an outer edge 164. Between the inner and outer edges and the upper and lower radials is defined a surface 152 on which the feed within the tub is lifted as the auger rotates. As the feed is lifted up on the auger, the feed will cascade off an outer circumferential edge 166 that runs between outer edges 158 and 164. As can be seen in FIG. 4, outer circumferential edge 166 decreases in radius from outer edge 164 to outer edge 158. This further promotes the feed cascading off the auger and back toward bottom 116 of tub 102.

Figure 5:
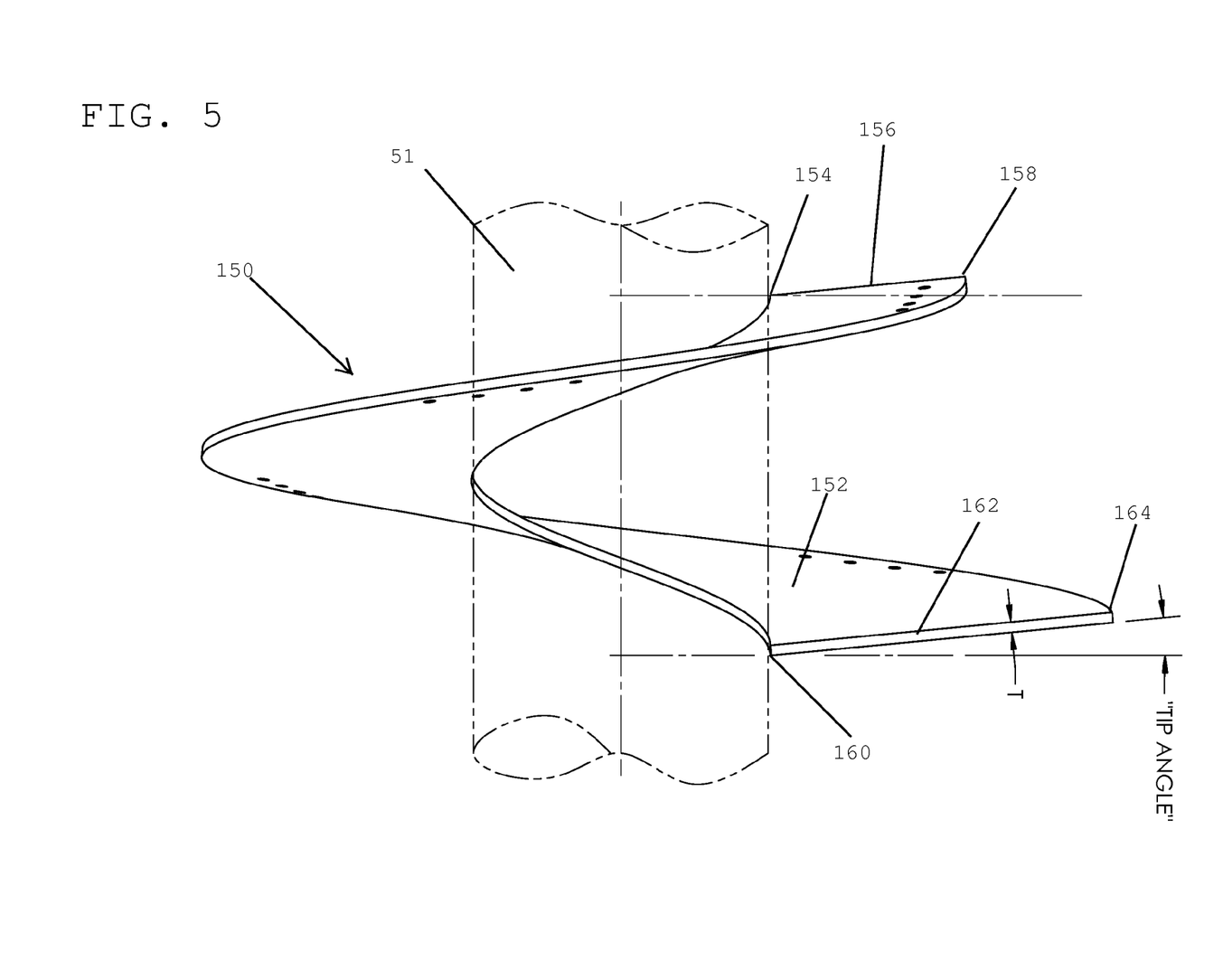
FIG. 5 is a side view of a portion of the fliting of a mixing auger according to the present disclosure for use with a vertical feed mixer.

Referring now to FIG. 5, a fliting portion 150 of an auger for a vertical feed mixer according to the present disclosure is shown which is configured to retain feed on the auger longer to promote mixing and chopping of the feed as the auger rotates within tub 102. Fliting portion 150 includes an upper radial 156 with an inner edge 154 adjacent shaft 51 and an outer edge 158. Outer edge 158 is positioned higher above tub bottom 116 relative to inner edge 154. Similarly, a lower radial 162 has an inner edge 160 adjacent shaft 51 and an outer edge 164, wherein outer edge 164 is positioned higher above tub bottom 116 relative to inner edge 160. As shown a lifting surface 152 of fliting portion 150 is generally consistently sloped upward from the inner edge to the radially positioned outer edge at an angle indicated in the FIG. as "TIP ANGLE."

It is anticipated that the TIP ANGLE formed by the fliting with respect to a radial line extending perpendicular from the shaft or tubing can be between approximately two (2) degrees and approximately ten (10) degrees. Current experience has shown for certain feeds and mixes of feeds, approximately five and one half (5.5) degrees is preferable. This angling of the fliting has proved to keep the feed within the hopper on the flite longer and promotes more thorough and quicker mixing of the feed as well as more rapid reduction of size of the elements of the feed.

Fliting portion 150 of FIG. 4 is shown with the entire flite having a uniformly tilted upper surface 152. It may be desirable to have the leading edge of the fliting configured to be generally parallel to the base of the hopper so that more feed from the base of the hopper is lifted and mixed. The hopper floor may be sloped to match the slope of the flite or the leading edge of the flite may be flattened to generally match the shape or contour, if any, of the base.

Alternatively, it is anticipated that a fliting portion according to the present disclosure may include a generally flat portion generally parallel to the bottom of the tub while still maintaining an outer edge raised within respect to a radially positioned inner edge. While the upper surfaces of the fliting portions of the FIGS. are shown as generally planar and consistent in angle from leading edge to trailing edge, it is anticipated that the top surface of the flights may vary in angle. The variation in angle may be between the leading edge and trailing edge as the flite transitions upwards, or may be variable from the inner edge to the outer edge. Alternatively, the variation of angle may be a combination of both top to bottom and inner edge to outer edge.

Figure 6:
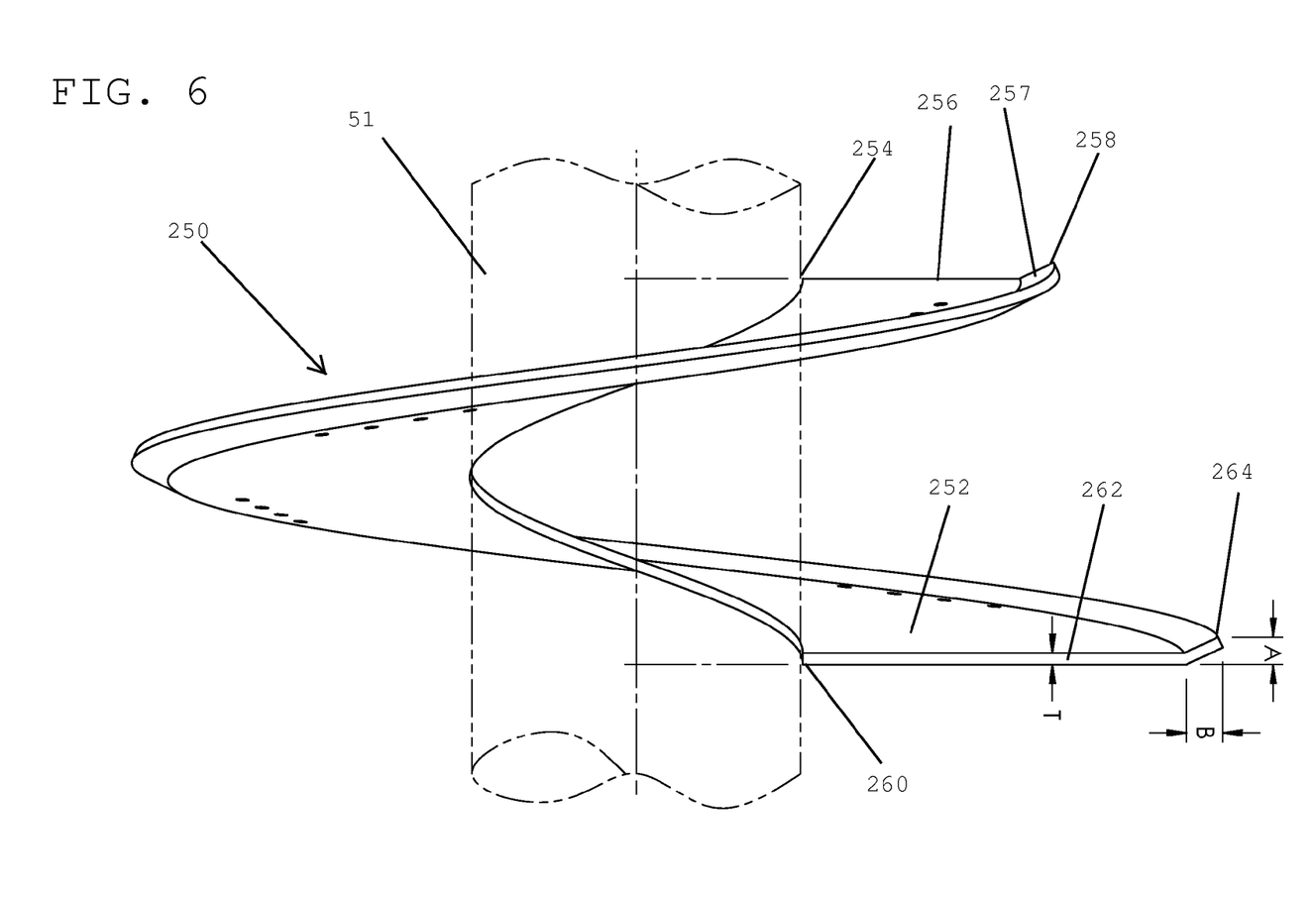
FIG. 6 is a side view of a first alternative embodiment of a portion of the fliting of a mixing auger according to the present disclosure for use with a vertical feed mixer.
Figure 7:
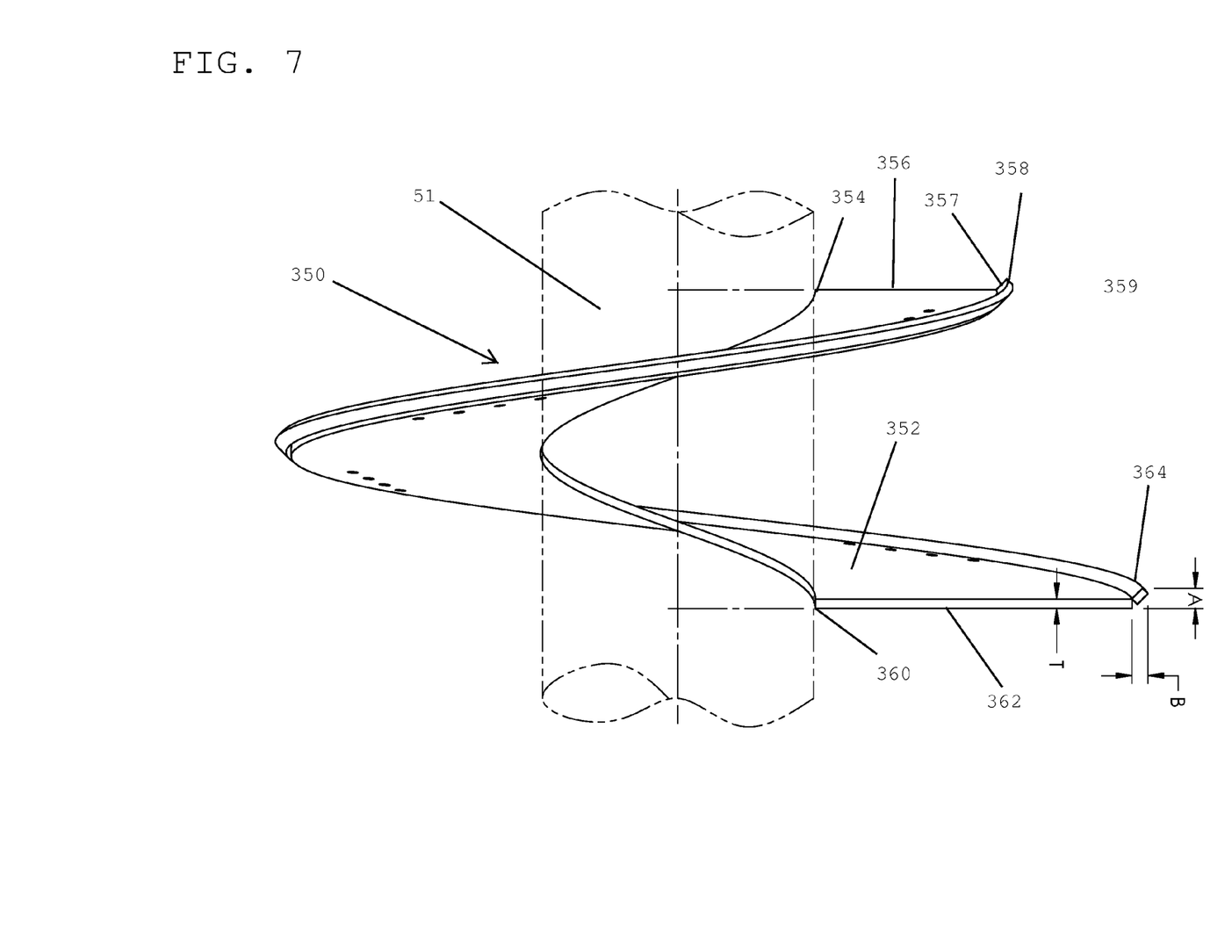
FIG. 7 is a side view of a second alternative embodiment of a portion of the fliting of a mixing auger according to the present disclosure for use with a vertical feed mixer.
Figure 8:
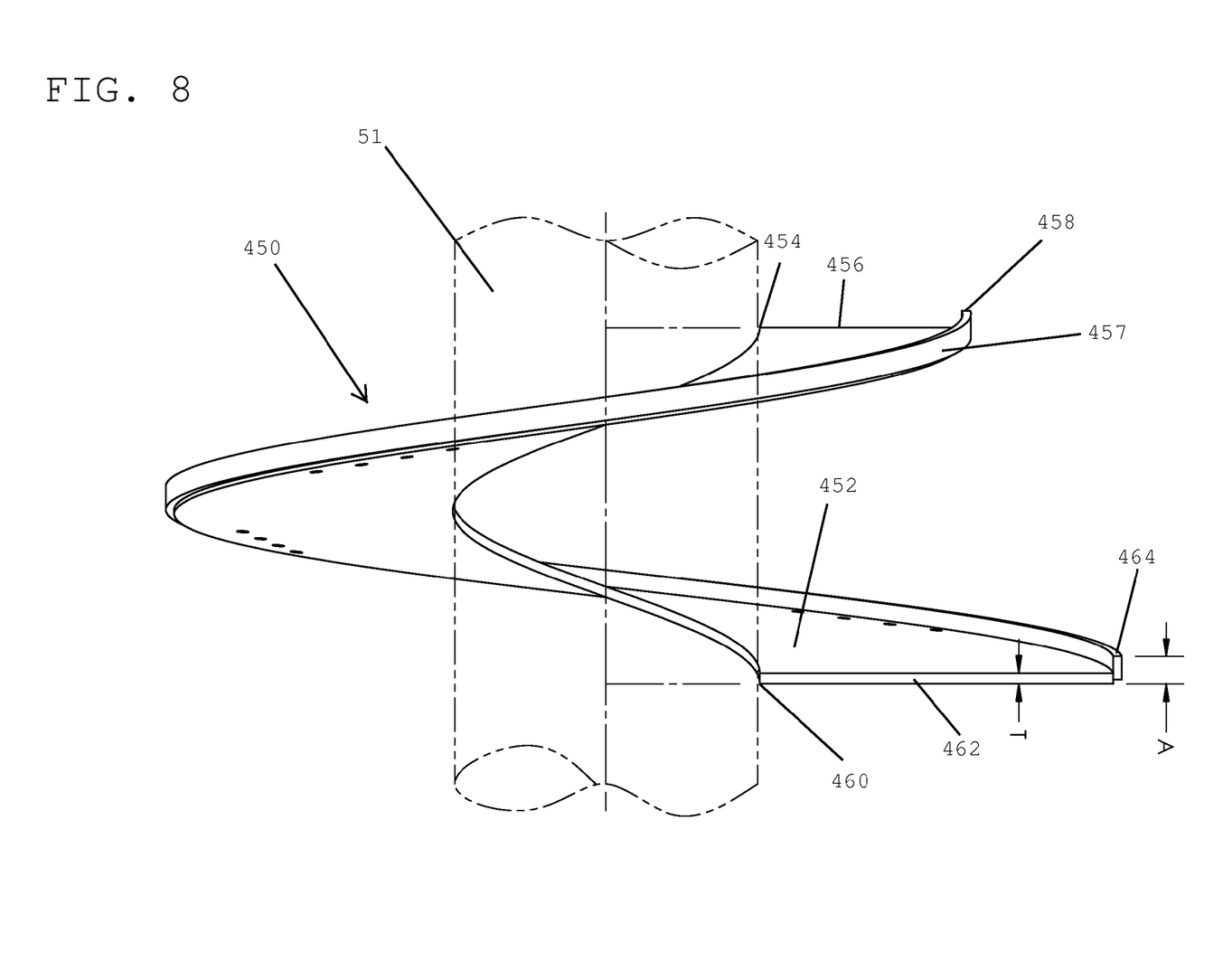
FIG. 8 is a side view of a third alternative embodiment of a portion of the fliting of a mixing auger according to the present disclosure for use with a vertical feed mixer.

FIGS. 6 to 8 illustrate different configurations of fliting portions according to the present disclosure. FIG. 6 illustrates an alternative embodiment of a fliting portion 250 configured for mounting about a shaft 51. An upper radial 256 includes an inner edge 254 adjacent shaft 51 and an outer edge 258 positioned generally above inner edge 254. A lifting surface 252 extends between the inner and outer edges and may be generally parallel to the tub bottom except adjacent outer edge 258 where a lip or angled portion 257 extends at an angle upwards to outer edge 258. As shown, angled portion 257 may formed integrally formed with fliting portion 250.

A lower radial 262 may include an inner edge 260 adjacent shaft 51 and an outer edge 264 positioned generally above inner edge 260. Angled portion 257 may also extend from generally parallel lifting surface 252 up to outer edge 264. Outer edge 258 and outer edge 264 may be generally the same height above inner edge 254 and inner edge 260, respectively, indicated in FIG. 6 by "A." Angled portion 257 may have a width indicated in FIG. 6 by "B" and while the angle of angled portion 257 may be greater than the angle described above, it is anticipated that the effective angle formed between the respective inner and outer edges should be between two and ten degrees.

FIG. 7 illustrates a third alternative embodiment of a fliting portion 350 configured for mounting about a shaft 51. An upper radial 356 includes an inner edge 354 adjacent shaft 51 and an outer edge 358 positioned generally above inner edge 354. A lifting surface 352 extends between the inner and outer edges and may be generally parallel to the tub bottom except adjacent outer edge 358 where a lip or angled portion 357 extends at an angle upwards to outer edge 358. As shown, angled portion 357 may be a separate piece that is joined to fliting portion 350, such as by welding or bonding.

A lower radial 362 may include an inner edge 360 adjacent shaft 51 and an outer edge 364 positioned generally above inner edge 360. Angled portion 357 may also extend from generally parallel lifting surface 352 up to outer edge 364. Outer edge 358 and outer edge 364 may be generally the same height above inner edge 354 and inner edge 360, respectively, indicated in FIG. 7 by "A." Angled portion 357 may have a width indicated in FIG. 7 by "B" and while the angle of angled portion 357 may be greater than the angle described above, it is anticipated that the effective angle formed between the respective inner and outer edges should be between two and ten degrees.

FIG. 8 illustrates a fourth alternative embodiment of a fliting portion 450 configured for mounting about a shaft 51. An upper radial 456 includes an inner edge 454 adjacent shaft 51 and an outer edge 458 positioned generally above inner edge 454. A lifting surface 452 extends between the inner and outer edges and may be generally parallel to the tub bottom except adjacent outer edge 458 where a lip or wall portion 457 extends generally upwards to outer edge 458. As shown, wall portion 457 may be a separate piece that is joined to fliting portion 450, such as by welding or bonding. Alternatively, wall portion 457 may be formed integrally with fliting portion 450.

A lower radial 462 may include an inner edge 460 adjacent shaft 51 and an outer edge 464 positioned generally above inner edge 460. Wall portion 457 may also extend from generally parallel lifting surface 452 up to outer edge 464. Outer edge 458 and outer edge 464 may be generally the same height above inner edge 454 and inner edge 460, respectively, indicated in FIG. 8 by "A." It is anticipated that the effective angle formed between the respective inner and outer edges should be between two and ten degrees.

It is understood that the higher outer edge improves the ability of the flite to hold feed longer and transition the feed higher within the hopper on the flite to improve the mixing and chopping operation of the vertical mixer beyond the performance of the conventional planar flites.

Figure 9:
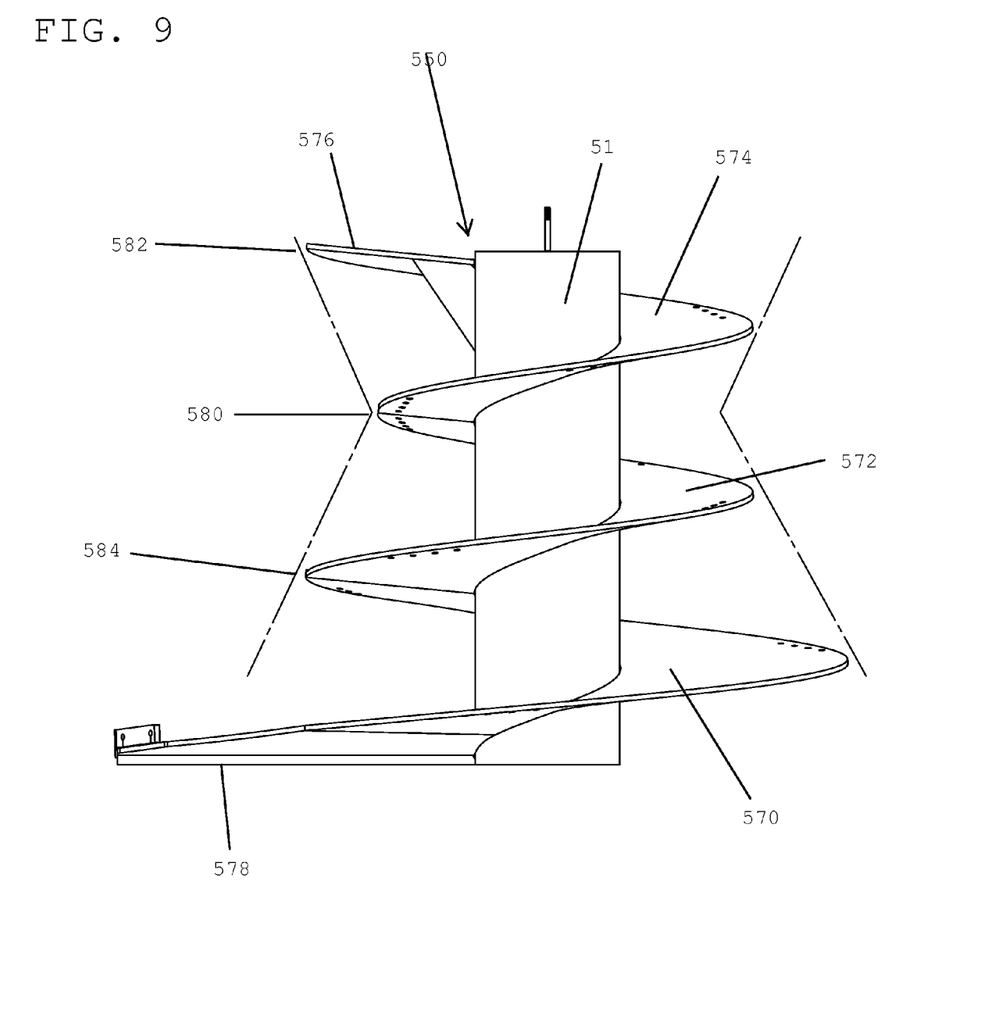
FIG. 9 is a side view of a fourth alternative embodiment of a portion of the fliting of a mixing auger according to the present disclosure for use with a vertical feed mixer.
Figure 10:
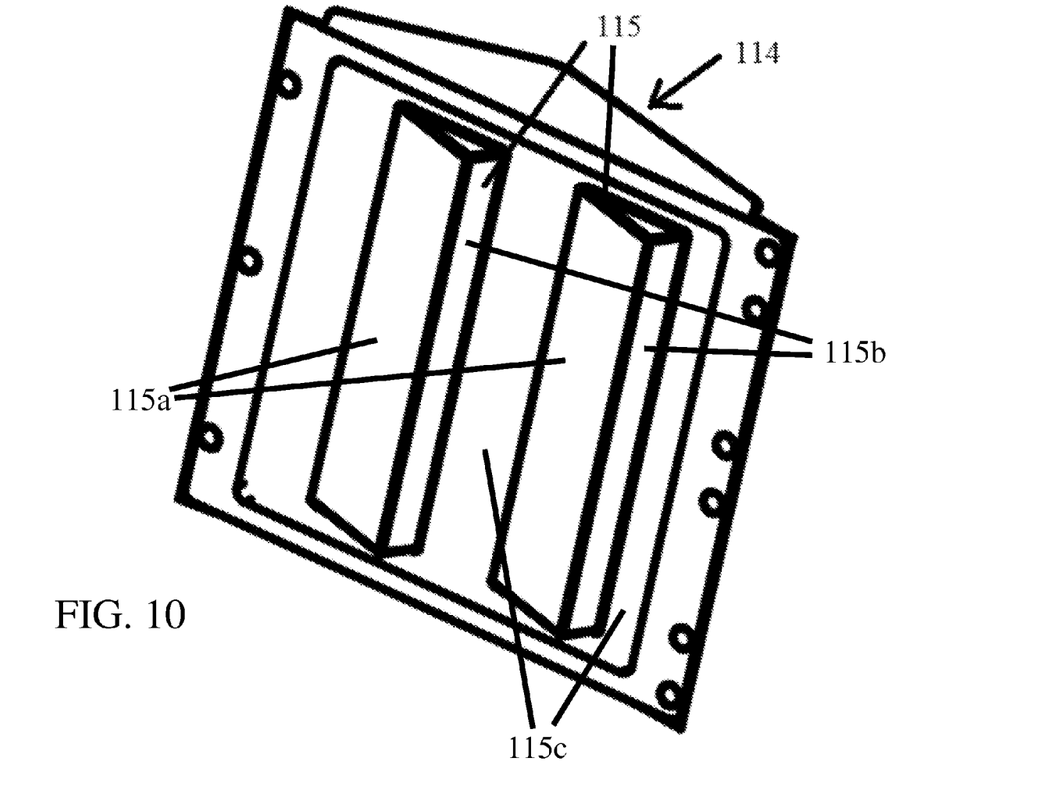
FIG. 10 is an enlargement of a portion of FIG. 1, showing the magnet.
Figure 11:
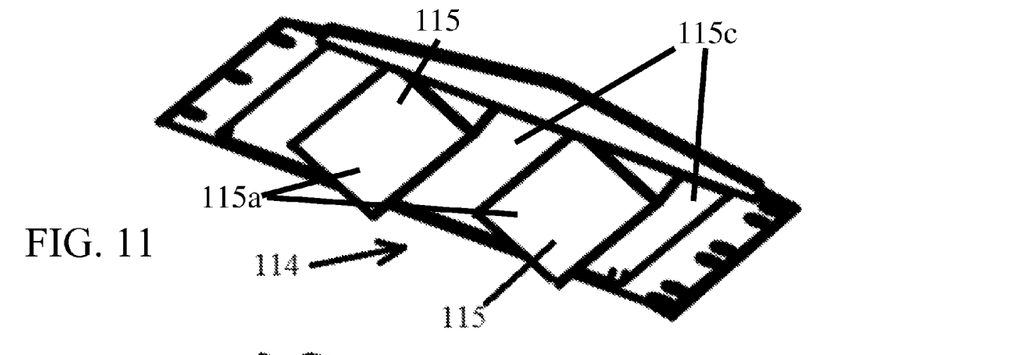
FIG. 11 is an enlargement of a portion of FIG. 2, showing the magnet.

Referring now to FIG. 9, a further embodiment of an auger 550 is shown configured for use with a vertical feed mixer such as mixer 100. Auger 550 may be comprised of multiple fliting portions. As shown by the dashed lines, auger 550 in rotation defines an hourglass shape. A lower portion 570 may be configured with a leading edge 578 configured to cooperate with the tub bottom to effectively engage and lift feed within tub 102. An intermediate portion 572 may extend between lower portion 570 and an upper portion 574 having an upper trailing edge 576. Portions 572 and 574 may be essentially mirror image elements that define a narrower auger shape 580 at a joint line 581 between the two portions between wider auger shapes 582 and 584 above and below narrower shape 580. It is anticipated that fliting portions as shown in FIG. 9 may include the raised outer edge as described above. It is further anticipated that the fliting portions shown in FIG. 9 may be configured with flat lifting surfaces as described in the prior art above.

As shown in FIGS. 1 to 3, an auger according to the present disclosure may be made of multiple fliting portions that define a generally conical shape, where the top of the auger is inwardly positioned with respect to the top of the side wall of the tub. The gap between the auger and the side wall adjacent the top of the auger is where bridging may occur. The hour glass shape defined by the rotation of auger 550 may serve to allow better operation of mixer 100. It is not uncommon for bridging of feed materials to occur near a top of tub 102 such that the feed materials do not descend into the tub to be mixed and chopped by the auger. These feed materials may then block the entry of other feed materials into the tub for mixing and chopping. An operator may need to climb onto the mixer and physically break up the bridged materials, which may be a dangerous and slow down the feeding operation. Trailing edge 576 extends outward toward the side wall of the tub and also upwards to dig into the bridged material and encourage it to fall into the tub without the need for user intervention.

While auger 550 is shown with two fliting portions being generally mirror images of each other for ease of design and manufacture, it is not necessary to have different fliting portions shaped similarly to each other. An auger according to the present disclosure may have only an upper and a lower fliting portion and still define the general hourglass shape and a trailing edge extending up into the bridging zone to dislodge feed materials. The two fliting portions may be similar shaped or may be unique with respect to each other. Alternatively, an auger may be made of more than three fliting portions, one or all of which may be uniquely shaped relative to the others.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A vertical feed mixer for mixing feed for livestock, the mixer comprising:
   a tub for containing the feed;
   an auger mounted generally vertically within the tub about a generally vertical shaft, the auger including a lower leading edge extending from the shaft adjacent a bottom of the tub and an upper trailing edge extending from the shaft opposite the bottom of the tub; and
   a magnet, formed in the form of a plurality of spaced apart steps defining a recess therebetween, and mounted inside the tub at a position on a side wall of the tub, such that the feed contacts the magnet.

2. The vertical feed mixer of claim 1, wherein the steps are arranged in a direction normal to a direction of feed flow produced by the auger.

3. The vertical feed mixer of claim 1, wherein the magnet is positioned adjacent the bottom of the tub and just above the height of the leading edge of the auger.

4. The vertical feed mixer of claim 1, wherein the steps are ramp-shaped.

5. The vertical feed mixer of claim 1, wherein each of the steps includes a feed-facing side and a leeward side.

6. The vertical feed mixer of claim 5, wherein the leeward side is more steeply angled than the feed-facing side.

7. A vertical feed mixer for mixing feed for livestock, the mixer comprising:
   a tub for containing the feed, the tub including a side wall and a bottom to define an inside and an outside of the tub;
   an auger mounted generally vertically within the tub about a generally vertical shaft, the auger including a lower leading edge extending from the shaft adjacent a bottom of the tub and an upper trailing edge extending from the shaft opposite the bottom of the tub; and
   a magnet mounted to the side wall on the inside of the tub such that the feed contacts the magnet, the magnet being shaped to protrude away from the side wall towards the inside of the tub, the magnet comprising a feed-facing side and a leeward side, wherein the leeward side is more steeply angled than the feed-facing side.

8. The vertical feed mixer of claim 7, wherein the feed-facing side and the leeward side are sides of a step.

* * * * *